UNITED STATES PATENT OFFICE.

HENRIK J. KREBS, OF WILMINGTON, DELAWARE.

METHOD OF RECOVERING SPENT TANNAGE LIQUORS.

SPECIFICATION forming part of Letters Patent No. 613,157, dated October 25, 1898.

Application filed November 3, 1897. Serial No. 657,279. (No specimens.)

*To all whom it may concern:*

Be it known that I, HENRIK J. KREBS, of Wilmington, New Castle county, Delaware, have invented an Improvement in Methods of Recovering Spent Tannage Liquors, of which the following is a specification.

My invention relates to a method of recovering spent tannage liquors, and is fully described and claimed hereinafter.

In the process of manufacturing morocco and other leathers chromate baths are frequently employed in the tannage, in which the skins are subjected to one or more baths, and the liquor thus used, becoming contaminated by organic matter and other impurities dissolved from the skins, is rendered unfit for further use and has heretofore been allowed to go to waste. The spent liquor is found to contain quantities of organic matter dissolved from the skins, earthy matter, lime in small quantities, alumina, and flesh and small pieces of skin detached from the pelts; but even when the liquor has been used to obtain the fullest benefit from the chromates the spent liquor contains a considerable quantity of chromic acid, ($CrO_3$,) which has heretofore been wasted.

It is the object of my invention to save this chromic acid either free or combined and to enable it to be utilized again in a chromate bath.

Chromic acid forms two classes of salts, the normal chromates and the bichromates, which readily pass from one into the other, according to the quantities of bases with which they are combined, the temperatures, and other conditions, and as both forms are found in the liquors and readily pass from one to the other I shall not attempt to distinguish between the normal chromates and bichromates in the specification or claims, and it is to be understood that I mean to include either or both forms.

A simple filtration or decantation of the spent liquor will remove a large portion of the organic matter and other impurities which it contains; but this purification can be effected much better by the precipitation of the dissolved impurities, and the precipitate thus obtained may be filtered much better.

In carrying out my invention, therefore, I first precipitate the impurities contained in the spent liquor by the use of a caustic, preferably caustic lime, then remove the precipitated impurities by filtration or decantation, thereby obtaining a purified liquor containing the unused portion of the chromic acid, and to this purified liquor I add a sufficient quantity of chromates and acids to produce a chromate bath of sufficient strength for use in the tannage process. In this manner I am able to save and utilize the chrome contained in the spent liquor.

The precipitation above referred to of the impurities in the spent liquor is preferably effected by the use of caustic lime, and the lime dissolved in the liquor may be precipitated either as sulfate of lime, oxalate of lime, or carbonate of lime and then removed by filtration or decantation, leaving the purified liquor containing the chrome, which may be regenerated by the addition of proper quantities of chromates and acids. The method of precipitating the lime in the form of sulfate of lime ($CaOSO_3$) may be effected by the addition of sulfuric acid, as represented by the following formula:

$$CaO + H_2SO_4 = CaOSO_3 + H_2O.$$

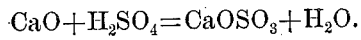

As sulfate of lime is, however, soluble to a considerable extent, this method does not afford means for the perfect removal of the lime and can be used with satisfactory results only when the lime is not present in large quantities. The method of precipitation of the lime in the form of oxalate of lime ($CaC_2O_4$) may be effected by the addition of oxalic acid, ($H_2C_2O_4$,) as represented by the following formula:

$$CaO + H_2C_2O_4 + H_2O = CaC_2O_4 + 2H_2O.$$

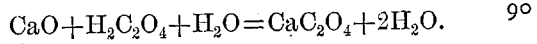

The oxalate of lime is insoluble in weak caustic solutions, and all of the lime can therefore be removed in this manner; but because of the expensiveness of oxalic acid I consider it preferable to precipitate the lime in the form of carbonate of lime, ($CaOCO_2$.) This may be effected to a limited extent by the addition of carbonic acid ($CO_2$) forced into the liquor or with carbonates, such as carbonate of soda, and the reaction is represented by the following formula:

$$CaO + CO_2 = CaOCO_2.$$

Carbonic acid does not decompose the lime chromates, but it acts to remove a considerable portion of the lime. When carbonate of soda is used, a double decomposition takes place and the lime is precipitated as carbonate of lime, while the soda remains in the solution.

In some cases the lime remaining in solution after the precipitation or removal of the organic impurities need not be removed, and in such cases the step of precipitating the lime may be omitted. The chromates, hydrochloric acid, and other ingredients may be added in such quantities as may be necessary to bring the purified liquor to the required strength and character desired for use in tannage; but the quantity of chromates, hydrochloric acid, or other ingredients to be added to the purified liquor to regenerate it is not material to my invention, as they may be added in any quantities to suit the strength and character of bath to be produced, as is now well understood in the tannage art, and as the baths differ materially in the different tannage processes used.

In carrying out my invention I first add the caustic (preferably in the form of lime milk) to the impure tanning liquor. The impurities which the liquor contains are precipitated thereby. I then remove the precipitate, preferably by filtration, then precipitate the lime in solution by the addition of the acid, remove this precipitate when present in objectionable quantities, and, finally, add the chrome and acid to restore the liquor to the desired strength. The process may, however, be modified by omitting the step of precipitating the lime held in solution in the liquid after the precipitation or removal of the organic impurities, and the chrome may be added directly to the same. The removal of the second precipitate is not essential, unless the impurities are present in objectionable quantities.

In practice, operating upon a spent tannage liquor containing only about one per cent. or less of chromates, I have obtained satisfactory results by the use of lime to effect the purification of the liquor, the weight of the lime solution added to the spent liquor being equal to approximately one-hundredth part of the weight of the wet skins or pelts which have been treated therein. This lime is added as a lime milk sufficiently thin to readily mix with the liquor, and to effect the neutralization and precipitation of the lime I have obtained excellent results by the use of one-half of one per cent. or one-half of the weight of the lime used of sulfuric acid 60°.

Having now described my invention, what I claim as new, and desire to secure by Letters Patent, is as follows:

1. The herein-described method of recovering spent tannage liquors containing chromates, which consists in precipitating the impurities which the spent liquor contains by the use of a caustic, removing such precipitated impurities, and finally adding chromates and acids to the purified liquor to restore it to a strength and character suitable for use in the tannage art.

2. The herein-described method of recovering spent tannage liquors containing chromates, which consists in precipitating the impurities which the spent liquor contains by the use of caustic lime, removing such precipitated impurities, and finally adding chromates and acids to the purified liquor to restore it to a strength and character suitable for use in the tannage art.

3. The herein-described method of recovering spent tannage liquors containing chromates, which consists in precipitating the impurities which the spent liquor contains by the use of caustic lime, removing such precipitated impurities, then removing the lime in solution by precipitation, and finally adding chromates and acids to the purified liquor to restore it to a strength and character suitable for use in the tannage art.

4. The herein-described method of recovering spent tannage liquors containing chromates, which consists in precipitating the impurities which the spent liquor contains by the use of caustic lime, removing such precipitated impurities, then removing the lime in solution by precipitation as carbonate of lime, and finally adding chromates and acids to the purified liquor to restore it to a strength and character suitable for use in the tannage art.

5. The herein-described method of recovering spent tannage liquors containing chromates, which consists in precipitating the impurities with caustic lime and removing the impurities thus precipitated, then bringing the lime in solution in the liquor in an insoluble form and removing it in such insoluble form.

6. The herein-described process of recovering spent tannage liquors containing chromates, which consists in precipitating the impurities contained in the spent liquor with caustic lime, precipitating the caustic lime in solution in the liquor, and then removing the precipitates.

7. The herein-described method of purifying impure liquors containing chromates, which consists in first precipitating the impurities which the liquor contains by the use of caustic lime, and removing said precipitated impurities.

In testimony of which invention I hereunto set my hand.

HENRIK J. KREBS.

Witnesses:
J. JACKSON PEIRCE,
J. BAIL PEIRCE.